Patented Apr. 14, 1936

2,037,053

UNITED STATES PATENT OFFICE 2,037,053

ADHESIVE

James E. Snyder, Kenmore, and Theron G. Finzel, Buffalo, N. Y., assignors to Du Pont Cellophane Company, Inc., New York, N. Y., a corporation of Delaware No Drawing. Application November 30, 1929, Serial No. 410,864

6 Claims. (Cl. 134—23.5)

This invention relates to adhesives and more particularly to adhesives for use with materials formed of or containing organic materials insoluble in water such as cellulose derivatives whereby said materials may be joined to similar or non-similar materials.

Recently there has appeared on the market a material comprising sheets or films of regenerated cellulose combined with a moistureproofing composition. The moistureproofing composition in one modification comprises a cellulose derivative, a gum or resin, a wax and a plasticizer, and is applied to one or both sides of a sheet or film of regenerated cellulose whereby a very thin surface film or coating, approximately one to two ten-thousandths of an inch thick, is produced. By reason of the fact that this material is flexible, transparent, non-tacky, non-odorous, and successfully resists the penetration of moisture or water vapor therethrough to a substantial degree for a substantial period of time, it has found extensive use as a wrapping tissue, particularly for maintaining various articles in their original fresh state. To attain the latter result, it is essential that the wrapping tissue completely envelope the product and be sealed.

None of the numerous known adhesives give satisfactory results when employed with this wrapping tissue. This is due to the fact that the composition of the surface coating is different from that hitherto known and the usual adhesives do not stick satisfactorily. Furthermore, the thinness of the surface coating renders such coated sheets incapable of being firmly cemented together by using a solvent and permitting evaporation of the solvent to unify the adjacent layers.

We have found that we can overcome the above-mentioned defects by providing a composition which wholly or partially dissolves, wets, or modifies the surface coating, in which condition it may be made to adhere to the desired materials, said composition comprising a solution and/or a suspension containing a cellulose derivative and a resinous substance.

It is, therefore, an object of this invention to provide an adhesive for wholly or partially dissolving, wetting, or otherwise modifying the surface of a material, in which state it may be caused to adhere to the desired materials.

A further object of this invention is to provide an adhesive which comprises a cellulose derivative and a resinous material such as natural or synthetic resins, semi-synthetic resins such as ester gums, and pitches, alone or combinations thereof.

Other objects will appear from the following description and appended claims.

An adhesive, to be satisfactory for use with moistureproof sheets or films of regenerated cellulose, should possess certain characteristics. In some cases, especially for hand application, it is desirable that the adhesive set substantially immediately and have little odor. In other instances, particularly when the adhesive is employed in the machine-manufacture of articles formed of moistureproof sheets or films of regenerated cellulose or in machine-wrapping of products in said sheets, it should be substantially free from stringing.

In general, it is desirable that the adhesive for the moistureproof sheets or films of regenerated cellulose be relatively stable and not susceptible to rapid change in composition upon exposure to atmospheric conditions or aging. It should produce a substantially permanent, colorless, odorless, and transparent joint, which joint is not affected by the normal variations in humidity or temperature. In addition, the adhesive should preferably not penetrate the film so as to cause the opposite side thereof to become tacky, nor should it weaken or deteriorate the film. The adhesive should promote sufficient tackiness in contact with the film to permit immediate adhesion. As above-mentioned, for hand application, this is rather essential. For machine use, this characteristic is not so important, since fingers or other mechanisms can be employed to hold the joint in place until set, and heat may be provided to facilitate the adhesion. For machine application, in the interests of continuous operation, it is desirable that the adhesive should not string. The adhesive should not corrode the various parts of machinery, metals, etc., when contacting therewith, and should dry quickly to form a non-tacky surface.

To attain the above-desired characteristics, we have found that a satisfactory type of adhesive for moistureproof sheets or films of regenerated cellulose comprises a solution or suspension in an organic solvent of cellulose derivatives and resinous materials such as natural or synthetic resins, semi-synthetic resins such as ester gums, and pitches alone or combinations thereof. This type of adhesive is especially good for machine use in that the adhesive is non-stringing and the accumulations thereof dry quickly to form non-tacky surfaces.

Various proportions of the ingredients may be used. Satisfactory results have been obtained from adhesives produced from the following ingredients in approximately the following quantities by weight:

| | Parts |
|---|---|
| Cellulose derivative | 5–30 |
| Resinous material | 5–30 |
| Solvent or solvent mixture | 90–40 |

It is to be understood that the adhesive, to be practical with moistureproof regenerated cellulose sheeting, must contain the resinous material in an amount not less than 70% of the cellulose derivative present.

The following specific examples hereinafter set forth describe several specific compositions. It is, of course, to be understood that the invention is not restricted to the specific proportions hereinafter set forth but that the proportions may be varied as desired.

*Example I*

| | Parts |
|---|---|
| Ethyl cellulose | 8 |
| Gum thus | 10 |
| Acetone | 82 |

*Example II*

| | Parts |
|---|---|
| Nitrocellulose | 9.1 |
| Gum dammar | 11.7 |
| Ethanol | 52.1 |
| Methanol | 2.7 |
| Acetone | 24.4 |

*Example III*

| | Parts |
|---|---|
| Ethyl cellulose | 8.0 |
| Glyptal resin | 15.0 |
| Acetone | 77.0 |

In the preparation of the compositions above set forth, the resin is extracted with a portion of the acetone. After filtering, the filtrate is added to the cellulose derivative dissolved in the remainder of the solvent.

*Example IV*

| | Parts |
|---|---|
| Ethyl cellulose | 5 |
| Gum dammar | 25 |
| Ethyl acetate | 25 |
| Acetone | 45 |

This composition may be prepared by extracting the resin with the ethyl acetate. After filtering, the filtrate is added to the cellulose derivative dissolved in the remainder of the solvent.

*Example V*

| | Parts |
|---|---|
| Nitrocellulose | 15.7 |
| Gum dammar | 15.0 |
| Monomethyl ether of ethylene glycol | 30.4 |
| Ethyl lactate | 16.8 |
| Ethanol | 22.1 |

*Example VI*

| | Parts |
|---|---|
| Nitrocellulose | 9.7 |
| Gum dammar | 15.0 |
| Monomethyl ether of ethylene glycol | 21.0 |
| Ethanol | 54.3 |

The compositions set forth in Examples V and VI may be prepared by extracting the resin with the monomethyl ether of ethylene glycol. After filtering, the filtrate is added to the cellulose derivative dissolved in the remainder of the solvent.

*Example VII*

| | Parts |
|---|---|
| Nitrocellulose | 23.5 |
| Gum dammar | 23.0 |
| Ethylene glycol monomethyl ether | 30.4 |
| Ethyl lactate | 16.8 |
| Ethanol | 22.1 |

This composition may be prepared by extracting the gum dammar with the solvent mixture, filtering, and dissolving the nitrocellulose in the filtrate.

In all of the above examples, the proportions given are by weight and represent the quantity of material used in compounding and not necessarily a composition of the finished adhesive. The actual resin content of the finished adhesive in some cases is somewhat lower than is indicated due to the incomplete solubility in the solvent concerned or due to the presence of foreign materials in the resins which are used.

In the above examples, a single resinous material is set forth. It is within the purview of this invention to employ a plurality thereof.

The ratio of total resin to total cellulose derivative is important. Mixtures containing less than 0.7 part of resin to 1 part of cellulose derivative in a solvent mixture give relatively poor joint strength. This is especially true for mixtures of low viscosity such as those shown in Examples I, II, III, IV and VI above, which require a much higher resin to cellulose derivative ratio.

The ethyl cellulose is preferably of high viscosity. As for the nitrocellulose, one having a viscosity of 8 seconds has given satisfactory results.

The above description refers particularly to adhesives for use with wrapping tissues comprising sheets or films of regenerated cellulose coated with a moistureproofing composition comprising a cellulose derivative, a gum or resin, a wax and a plasticizer. It is, of course, to be understood that the adhesives are not limited to this specific material. They may be employed with other materials formed of or containing cellulose derivatives. For example, the adhesives are applicable to articles formed of or containing cellulose acetate or cellulose nitrate, such as plastics, artificial leather, novelties, photographic films, and the like. Similarly, while the adhesives are specifically designed to join two surfaces of or comprising celullose derivatives, these adhesives are also capable of use in joining a surface of a material containing a cellulose derivative to various materials such as paper, cardboard, cloth, metal foil, metal sheets, and the like.

To seal, secure, or join a material of the type herein described such as, for example, moistureproof regenerated cellulose sheeting, to itself or other material, it is only necessary to apply the adhesive to at least one of the surfaces which are to be in contiguous and superposed relationship. Subsequently, the materials are brought into proper position, and with the aid of pressure the materials are brought into intimate contact and the adhesive permitted to set. If desired, heat may be employed to accelerate and expedite the setting operation.

Since it is obvious that various changes in the specific details above set forth may be made by one skilled in the art, this invention is not restricted thereto except as set forth in the appended claims.

We claim:

1. An adhesive for sealing, securing or joining moistureproof materials, including moistureproof sheets or films of regenerated cellulose, to similar or non-similar materials consisting of a cellulose derivative, a resinous material, and a solvent, the ratio of said resinous material to said cellulose derivative being not less than 0.7:1.0.

2. An adhesive for sealing, securing or joining moistureproof materials, including moistureproof sheets or films of regenerated cellulose, to similar or non-similar materials consisting of the following ingredients in substantially the following approximate parts by weight:

| | Parts |
|---|---|
| Cellulose derivative | 5-30 |
| Resinous material | 5-30 |
| Solvent | 90-40 | the ratio of said resinous material to said cellulose derivative being not less than 0.7:1.0.

3. An adhesive for sealing, securing or joining moistureproof materials, including moistureproof sheets or films of regenerated cellulose, to similar or non-similar materials consisting of the following ingredients in approximately the following proportions:

| | Parts |
|---|---|
| Nitrocellulose | 9.1 |
| Gum dammar | 11.7 |
| Ethanol | 52.1 |
| Methanol | 2.7 |
| Acetone | 24.4 |

4. An adhesive for sealing, securing or joining moistureproof materials, including moistureproof sheets or films of regenerated cellulose, to similar or non-similar materials consisting of the following ingredients in approximately the following proportions:

| | Parts |
|---|---|
| Nitrocellulose | 15.7 |
| Gum dammar | 15.0 |
| Monomethyl ether of ethylene glycol | 30.4 |
| Ethyl lactate | 16.8 |
| Ethanol | 22.1 |

5. An adhesive for sealing, securing or joining moistureproof materials, including moistureproof sheets or films of regenerated cellulose, to similar or non-similar materials consisting of the following ingredients in approximately the following proportions:

| | Parts |
|---|---|
| Nitrocellulose | 9.7 |
| Gum dammar | 15.0 |
| Monomethyl ether of ethylene glycol | 21.0 |
| Ethanol | 54.3 |

6. An adhesive for sealing, securing or joining moistureproof materials, including moistureproof sheets or films of regenerated cellulose, to similar or non-similar materials consisting essentially of a cellulose derivative, a resinous material and a solvent, the ratio of said resinous material to said cellulose derivative being not less than 0.7:1.0.

JAMES E. SNYDER.
THERON G. FINZEL.